United States Patent
Pelletier

[11] 3,883,382
[45] May 13, 1975

[54] METHOD AND APPARATUSES FOR RETREADING WORN TIRES

[75] Inventor: Guy Pelletier, Melbourne, Quebec, Canada

[73] Assignee: Bombardier Limited, Valcourt, Quebec, Canada

[22] Filed: Oct. 27, 1972

[21] Appl. No.: 301,272

[30] Foreign Application Priority Data
Nov. 3, 1971 Canada .................... 126801

[52] U.S. Cl. ............... 156/96; 156/128; 156/394; 264/315; 264/326; 425/17
[51] Int. Cl. ..................... B29h 5/04; B29h 5/16
[58] Field of Search ............ 156/95, 76, 110, 123, 156/126–130, 394, 394 FM; 264/36, 315, 316, 326; 425/11, 17–25

[56] References Cited
UNITED STATES PATENTS

| | | | |
|---|---|---|---|
| 2,014,010 | 9/1935 | Wheatley | 156/127 |
| R15,120 | 6/1921 | Pfeiffer | 156/96 |
| 2,292,286 | 8/1942 | Owen | 156/96 |
| 2,468,121 | 4/1949 | Shell | 156/394 FM |
| 2,766,006 | 10/1956 | Kraft | 156/394 FM |
| 2,989,779 | 6/1961 | White | 425/23 |
| 3,118,181 | 1/1964 | Cork | 425/23 |
| 3,324,506 | 6/1967 | Rifchin | 425/23 |
| 3,585,686 | 6/1971 | Balle | 425/19 |
| 3,698,975 | 10/1972 | Hogan | 156/96 |
| 3,745,084 | 7/1973 | Schelkmann | 156/394 FM |

FOREIGN PATENTS OR APPLICATIONS

| | | | |
|---|---|---|---|
| 450,885 | 8/1948 | Canada | 425/19 |
| 634,953 | 1/1962 | Canada | 156/394 FM |

*Primary Examiner*—Clifton B. Cosby
*Assistant Examiner*—John E. Kittle
*Attorney, Agent, or Firm*—Fetherstonhaugh & Co.

[57] ABSTRACT

Method and Apparatus for retreading a pneumatic tire wherein the periphery is buffed, and then a fully prevulcanized replacement tread band is disposed around the buffed surface of said tire with a thin layer of uncured bonding material between said buffed surface and the inner surface of the tread band comprising: mounting the tire on rim means which positively locates the beads of the tire; forming a steam chamber inside said tire with a steam impervious envelope; closely encircling the periphery of said tire with an annular steam chamber with a smooth bearing surface for contacting the outward surface of the tread band; disposing a resilient ring on each lateral edge of said tread band for inwardly pressing over the junctions between said tread band and the sides of said tire; and maintaining said resilient rings in place during the curing of the bonding layer.

11 Claims, 6 Drawing Figures

METHOD AND APPARATUSES FOR RETREADING WORN TIRES

This invention relates to retreading of worn tires and, more particularly, to a method and apparatuses for retreading worn tires using a prevulcanized replacement tread band.

The replacement of a tire tread band has until recently been done mainly by the vulcanizing of a strip of non-vulcanized rubber directly onto a worn tire with the formation of the treaded surface in situ. Such conventional method of retreading is relatively complex, lengthy and hazardous and, therefore, is not commercially satisfactory.

More recently, there have been proposed a method and an apparatus for retreading worn tires using a prevulcanized replacement tread band. The latter method and apparatus are not found satisfactory, since the replacement tread band does not adhere firmly and often separates from the carcass. There results an unreliable and unacceptably short life of the tires retreaded by the latter method and apparatus.

In order to fully understand the merit of the present invention, it must be noted that temperatures used for vulcanizing a tire must stay within maximum and minimum limits to produce a resistant adherence and the lower is the temperature within the limits, the more resistant is the bond between the new tread band and the worn tire and the more resistant to wear will be the new tread band. Also, another important factor to consider is that the thicker is the rubber layer that has to be traversed by the heat, the longer has the heat to be applied at a given temperature.

It is the main object of the invention to produce a retreaded tire which will have an acceptable life.

It is another general object of the invention to provide a method and an apparatus to produce a retreaded tire having an acceptable and reliable life.

It is another object of the invention to provide a method and an apparatus which are safer and faster than the hitherto used conventional method and apparatus in order to allow a more efficient operation.

It is a more specific object of the invention to provide a method and an apparatus adapted to produce a vulcanized bond between a prevulcanized tread band and a worn tire by heating from both sides of the bond and applying relatively low pressures, whereby to require less heat and time to vulcanize the bonding adhesive.

The invention will not be described in detail with reference to preferred method and apparatuses thereof, the latter being illustrated, by way of example only, in the accompanying drawings, in which:

FIG. 2 is a cross-section along line 2—2 of FIG. 1;

Figure 1:
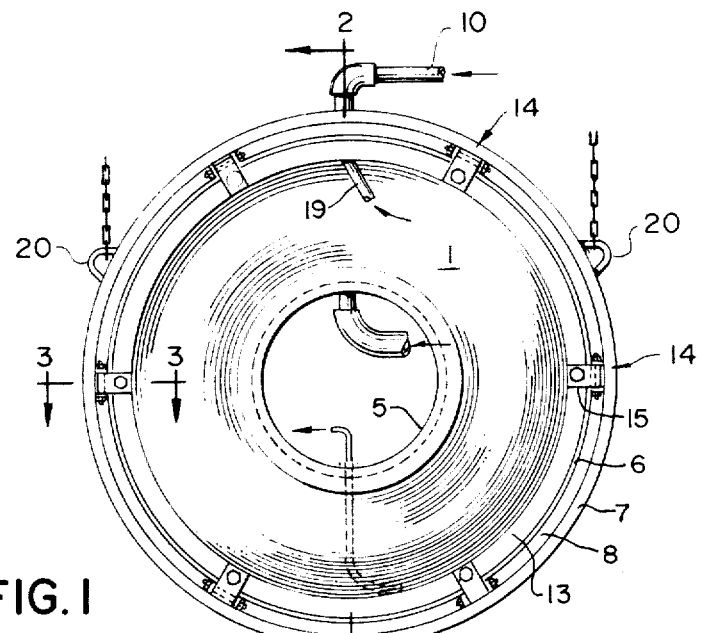
FIG. 1 is an elevation of the apparatus with a tire therein.

A worn tire is shown at 1 and its outer peripheral surface, which has been suitably prepared by known buffing techniques is fitted with a prevulcanized new tread 2, in the form of an annular band of rubber reinforced by fabric 3 (see FIG. 2).

The cold cure retreading apparatus illustrated comprises an outer ring structure 4 and an inner ring or rim 5. The outer ring structure 4 is composed of annular inside and outside steel bands 6 and 7, rigidly secured to one another and maintained in spaced-apart relation by spacer strips 8, so as to define an annular outer steam chamber 9 therebetween fed with steam through connector nipple 10. The steel band 6 defines a peripheral belt that has a transversely flat, smooth inner face closely encirling the outer face of the replacement tread band 2. One side of the outer ring structure 4 is provided with an inwardly projecting flange, or ring 11, rigidly secured thereof, defining means for retaining a resilient ring 12 made of small diameter inflatable flexible tube. Resilient ring 12 rests against flange 11, and bears against the junction between the tread band 2 and tire 1.

Figures 3, 4:
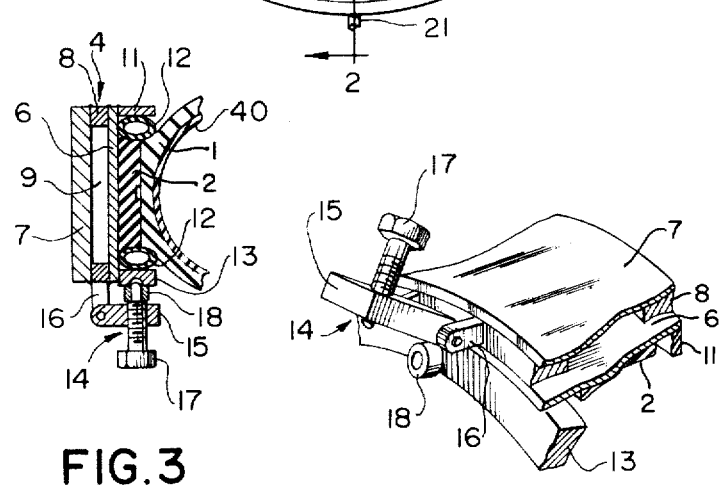
FIG. 3 is a partial cross-section along line 3—3 of FIG. 1.
FIG. 4 is a partial perspective view of the external steam ring.

A similar tube 12 is applied against the other lateral edge of the replacement tread band 2 and tire 1 and is pressed inwardly toward the junction by means of a removable retaining means or ring 13. This ring is releasably held in position by a plurality of locking assemblies 14 mounted at equal intervals along one lateral edge of the outer ring structure 4, as shown in FIGS. 1, 3, and 4.

Figure 5:
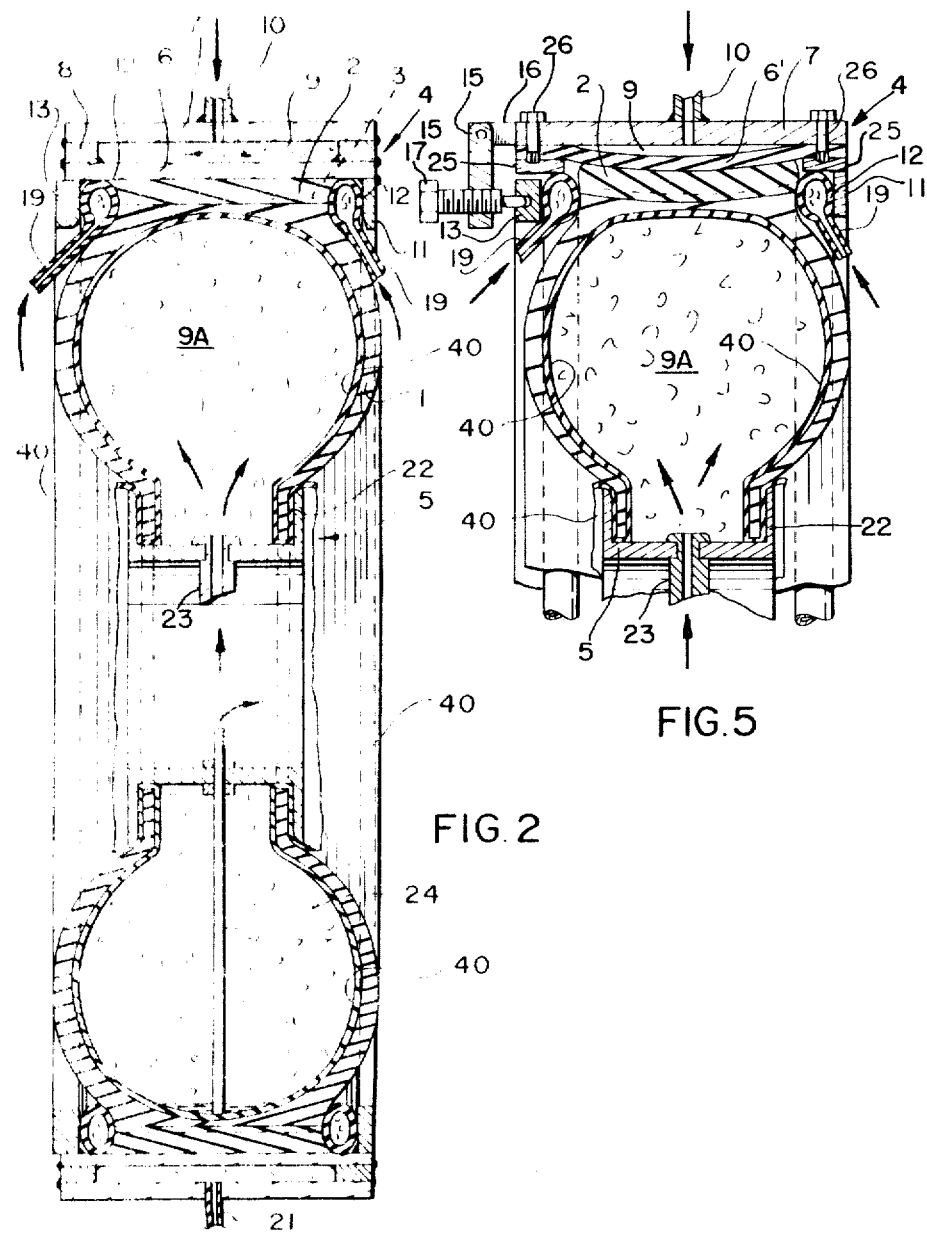
FIGS. 5 and 6 are partial cross-sections, similar to those of of FIG. 2, but showing modified apparatuses.

A plate 15 is pivoted on ears 16, which are secured to the spacer ring or strip 8. Plate 15 has a threaded bore for receiving a bolt 17. The inner smaller diameter smooth end thereof is adapted to engage with a sliding fit the hole of a boss 18, welded to the side of ring 13 as shown in FIG. 4, or simply a hole through ring 13 as seen in FIG. 5.

Each inflatable tube 12 is provided with an inlet flexible nipple 19 for admission of compressed air inside the tube 12. The outer ring structure 4 is held suspended, such as by brackets 20, which could be replaced by a single bracket at the top end in a vertical position wherein the steam supply nipple or inlet 10 is uppermost, while the outlet tube 21 is lowermost, said outlet tube being connected to the outer steam chamber 9 for the evacuation of water of condensation.

The inner ring, or rim 5, is generally similar in cross-section to the rim of a standard automotive metal wheel for receiving a tire and has radially outwardly projecting flanges 22 overlapping the toes or beads of the tire side walls to confine the latter against lateral outward displacement. The inside of tire 1 is lined with a steam impervious flexible elastic lining 40, preferably of rubber to protect the tire 1 against possible deterioration by direct contact with steam. The marginal portions of stretchable lining 40 are folded around the beads of the tire side walls to be held by rim flanges 22 thereby defining inner steam chamber 9A. When the assembly is held by brackets 20, the steam supply tube 23 connects with the inside of the tire 1 through rim 5 at a topmost portion thereof, while tube 24 extends within the tire at the lowermost portion thereof, said tube 24 being curved to follow closely the inside wall of the tire at the periphery thereof and being provided with perforations for collecting water of condensation inside the tire.

The above-described apparatus as illustrated in FIGS. 1 to 4 is intended for substantially only one size of tires. The modified retreading apparatuses of FIGS. 5 and 6 can be used for tires of different sizes within predetermined limits.

In the apparatus of FIG. 5, all the elements are identical with those of the preceding embodiment, except for the outer ring structure 4, which is different in some respect. The inside annular steel band 6 of FIGS. 1 to 4 inclusive is replaced by a flexible annular band 6' of reinforce rubber or like steam impervious material. Rubber band, or peripheral belt, 6' is held against the outside annular band 7 by annular rigid strips 25 and bolts 26 extending through the outer ring structure 4 at circumferentially spaced-apart points along the opposite lateral edges thereof. Hence, the lateral edges of rubber annular band 6'' are retained in steam sealing engagement to the edges of band 7 defining therebetween the outer steam chamber 9.

Figure 6:
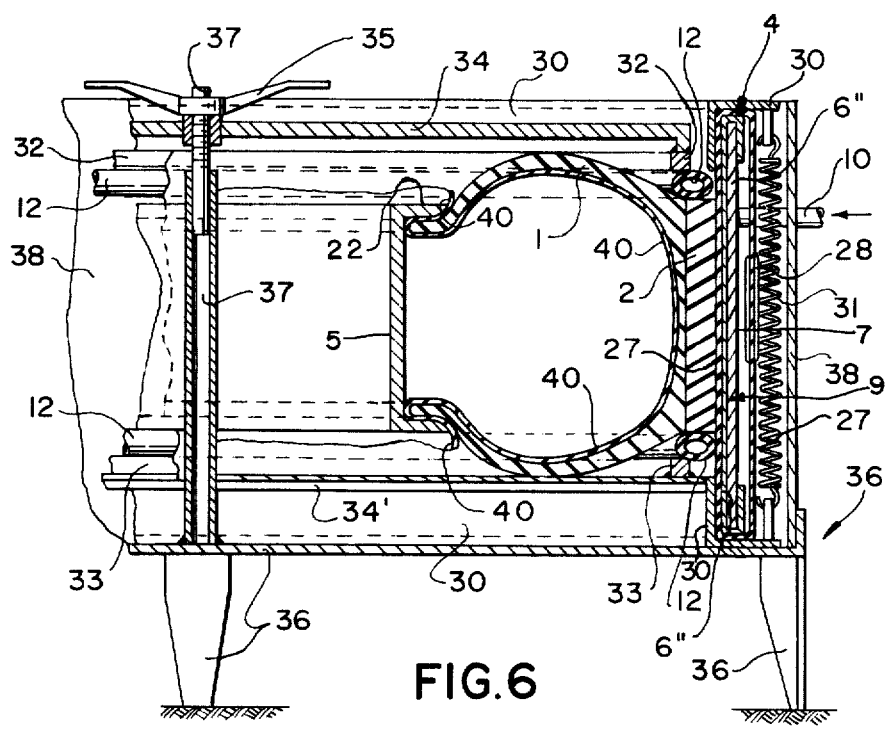

In the apparatus of FIG. 6, the inside annular band 6 of FIGS. 1 to 4 has been replaced by an endless belt 6'' of non-reinforced rubber or like steam impervious material which is stretchable and a flexible tension sheet 27, of nylon or other non stretchable flexible material. The endless belt 6'' is wider than the rigid band 7 and is folded around and over the edges thereof.

The tension sheet 27 is wrapped transversely and circumferentially around the ring structure 4, and has a central portion diposed between the endless belt 6'' and the replacement tread band 2. Its opposite lateral marginal portions are folded about the edges of rigid band 7 with the endless belt 6'' therebetween, and these marginal portions are arranged to meet exteriorly of the ring structure 4. The opposite lateral edge portions of the sheet 27 are interlaced by a cord 28 or held by any suitable expedient, to closely engage around the opposite lateral edges of the ring structure 4. Annular retainers or brackets 30, of angle cross-section, are positioned against the opposite lateral edges of the ring structure 4 with one flange parallel to and positioned radially inwardly of the ring structure 4 and the other flange being planar and resting over the side edges of outer steam chamber 9. A plurality of tension springs 31 are connected across annular brackets 30 around the circumference thereof to urge the same into engagement with the opposite lateral edges of the ring structure 4 to coact with the nylon sheet 27 to seal endless belt 6'' against egress of fluid at the edges of ring structure 4.

It must be noted that the nylon sheet 27 replaces the cord reinforcement of the inside annular band 6' of FIG. 5 to give more flexibility to the inside endless belt 6'', while holding the latter against excessive bulging. The endless belt 6'' with its adjacent portion of sheet 27 bulge together on one side of chamber 9 and hence together form the peripheral belt contacting the outward surface of the tread band.

Should overpressure develop between endless belt 6'' and rigid band 7, steam will escape along the edges of steel band 7, springs 31 being calibrated to that effect thereby acting as a safety valve; preferably springs 31 are set to allow escape of steam when the pressure exceeds about 40 lbs per square inch (p.s.i.). A retaining means or flange 33 is fixed to the lower annular bracket or retainer 30 and extends radially inwardly therefrom to retain the lower resilient tube or ring 12. A disc shaped cover 34 which also carries a retaining means or flange 32 is releasably retained by a threaded element 35 on a threaded pin 37 extending centrally upwardly from a supporting base 36. Base 36 is in the form of a shallow cylindrical receptacle 36, 38 that houses the outer ring structure 4. The flanges 32 and 33 are spaced inwardly of the tension sheet 27 to allow free movement of the latter and the endless belt 6'' across the full width of the tread band 2.

The operation of the apparatuses described and the process of retreading are as follows:

As is well known, the peripheral surface of a worn tire is first cleaned and roughened to enhance adherence. A layer of vulcanizable bonding adhesive of rubber is spread over the suitably prepared surface before applying a fully prevulcanized replacement tread band 2 thereover.

If necessary, the tire beads or toes are spread apart by a conventional tool, so as to decrease its overall diameter. The tread 2 is fitted around the worn tire. Then the latter is lined with steam impervious stretchable lining 40 and the assembly is mounted on rim 5. One resilient ring 12 is placed against flange 11 (FIGS. 1-5 or 32 (FIG. 6) all around the inside of outer ring structure 4 and the tire with its replacement tread band 2 are fitted within the outer ring 4 (or shallow annular curing receptacle 36 as in FIG. 6) until it abuts the already positioned resilient ring 12. The other resilient ring 12 is placed in position; resilient ring 13 (FIGS. 1-5) or cover 34 (FIG. 6) is fitted over cylindrical receptacle 36 and locked in position either by pivoting plates 15 inwardly and screwing bolts 17, so that the inner end will engage the hold in bosses 18 (FIGS. 1-5), or by screwing screw means 35 (FIG. 6). Should resilient rings be inflatable, as in FIGS. 1 to 5, they are connected to a source of air under pressure at about 45 pounds per square inch through supply tubes 19. Steam under a pressure of about 30 to 35 pounds per square inch, at 280° to about 300°F., is supplied to the annular outer steam chamber 9 between the rigid band 7 and the flexible endless belt 6 (FIGS. 1-4), 6' (FIG. 5) or 6'' (FIG. 6). Through nipple 10 and steam is simultaneously supplied within the tire 1 (inner steam chamber 9A) through supply tube 23 at about 70 pounds per square inch at a temperature of about 305°F. The tire and its tread are heated for about one and a half hour. The steam heats the inside of the tire faster than the outside of the tread, resulting in quick curing of the adhesive and adhering of the prevulcanized tread band 2 to the tire 1 while the lower temperature applied to the tread band 2 avoids heat damage to the latter. The air tubes 12 apply pressure at the junction of the tread and tire to form a smooth finish at the outer edges of said junction on the sides of the tire. Tubes 21 and 24 remove the water of condensation. Because steam is supplied to the inside of the tire, it cures any patched hole of the worn tire. Tubes 12 in FIG. 6, could be replaced by rings or washers which would be non-inflatable and made of compressible material to apply the required pressure at the tread and tire junction. Once the layer of adhesive is cured, the steam supplies are cut off and the pressure is allowed to drop to a safe level at which point the tire is removed from the curing device and freed of its rim 5 and lining 40.

Steam does not affect the tire rubber because there is no direct contact; and since steam is supplied at a maximum pressure of 70 pounds, the apparatus is very safe.

It must be noted that the above described embodiments permit cold cure retreading by means of heat applied from both sides of the bond while pressure is maintained across the junction.

It must be appreciated that punctures in the worn tire may be easily sealed from the interior by taking advantage of the interior heating to cure an adhesive or patch in place over the punctures.

Heating from the interior of the worn tire allows to more quickly reach the bond and results in faster vulcanization thereof.

In the embodiment of FIG. 6, the outer ring structure 4 is preferably made sufficiently wide so that the chamber formed between tension sheet 27 and belt 6' is at least twice the width of the tire tread and the latter positioned centrally of said chamber so as to obtain a bulging effect thereof (not shown) on both sides of the replacement tread. Thus a more uniform pressure is applied to the replacement tread and this also allows the use of a low steam pressure in the outer steam chamber 9 due to the inwardly radially directed pull exerted by the bulging sides of the chamber 9 on the central portion thereof.

The embodiments of the invertion in which an exclusive property or privilege is claimed are defined as follows:

1. A cold cure retreading apparatus for retreading a worn pneumatic tire whose periphery has been buffed, by means of a fully prevulcanized replacement tread band disposed around the buffed surface of said tire with a thin layer of uncured bonding material between said buffed surface and the inner surface of said tread band; said apparatus comprising a rim mounted centrally of said tire for preventing lateral outward displacement of the beads of the tire, a steam impervious lining for covering the inside surface of said tire and for defining in conjunction with said rim an inner steam chamber, an inner chamber steam supply means in communication with said inner steam chamber for feeding steam to said inner chamber, a peripheral belt for closely encircling the periphery of said tire with said tread band in place thereon, said belt presenting a smooth bearing surface for contacting the outward surface of said tread band, a resilient ring disposed on each lateral edge of said tread band for inwardly pressing over the junctions between said tread band and the sides of said tire, means for retaining said resilient rings in place during curing of said adhesive material, an outer rigid band circumscribing said peripheral belt and defining therewith an outer steam chamber for applying heat to the outward surface of said tread band during said curing, and outer chamber steam supply means in communication with said outer steam chamber for feeding steam to said outer steam chamber.

2. Apparatus as defined in claim 1 wherein said peripheral belt comprises a rigid cylindrical wall whose outside diameter is slightly less than the inside diameter of said outer rigid band, and whose inside diameter corresponds to the overall diameter of said tire with said tread band in place thereon, said apparatus also comprising two spaced apart spacer strips retaining said rigid cylindrical wall and said outer ring band to one another and defining therewith said outer steam chamber; one of said means for retaining said resilient rings in place being removable for allowing removal of the associated resilient ring thereby freeing said tire.

3. Apparatus as defined in claim 1 wherein said peripheral belt comprises an annular band of reinforced rubber or like steam impervious material whose lateral edges are retained in steam sealing engagement to the edges of said outer rigid band, and wherein one of said means for retaining said resilient rings in place is removable for allowing withdrawal of said tire.

4. Apparatus as defined in claim 3 wherein said annular band of reinforced rubber or like material comprises an endless belt of rubber or like steam impervious flexible material whose width exceeds that of said outer rigid band sufficient for the lateral marginal portions of said endless belt to fold over the opposite edges of said rigid band, said annular band also comprising a flexible tension sheet of generally non-stretchable material which is sufficiently wide for its lateral marginal portions to fold over said endless belt when the latter is in place over said outer band, said apparatus also comprising two annular retainers of angle cross-section fitting over the opposite lateral edges of said outer band and overlying said lateral marginal portions of said endless belt and of said tension sheet, and resilient means interconnecting said two annular retainers and preventing separation thereof with sufficient force to prevent excape of steam from within said outer steam chamber at the edges of said outer band when the pressure of said steam in said outer steam chamber is below a predetermined maximum pressure, each annular retainer having a first flange extending inwardly of said annular band and parallel thereto, and each annular retainer having a planar flange resting over the side edges of said annular band.

5. Apparatus as defined in claim 4 wherein said predetermined pressure is about 40 p.s.i.

6. Apparatus as defined in claim 1 wherein said resilient rings are inflatable rubber tubes of relatively small cross-section.

7. Apparatus as defined in claim 3 including bolts pivotally mounted to said outer band at spaced apart locations around the periphery thereof and arranged to retain in position said one means for retaining said resilient rings in place during curing.

8. Apparatus as defined in claim 4 including a cylindrical receptacle for housing said peripheral belt and said rigid outer band, including a disc shaped cover, a screw means for retaining said cover in place during curing, said cover carrying said one of said means for retaining said resilient rings.

9. A cold cure retreading process for pneumatic tires comprising preparing the tread portion of a worn pneumatic tire for obtaining a clean and roughened surface suitable for retreading, applying to said roughened surface a fully prevulcanized replacement tread band with a layer of heat curing bonding adhesive disposed between the inner surface of said tread band and said roughened surface, placing a steam impervious flexible lining inside said tire, mounting a tire bead retaining rim centrally of said tire hence defining an inner steam chamber within said tire, placing said tire within a shallow annular curing receptacle comprising an outer steam chamber whose inner wall is a smooth surface closely encircling said tread band, laterally confining the junctions of said tread band and said roughened surface by means of resilient ring means, simultaneously supplying steam to said inner steam chamber and to said outer steam chamber for a period of time and at a temperature sufficient to allow curing of said adhesive, said steam causing radial compression of said tread band onto said roughened surface, and as the last steps in the process cutting off the supply of steam, allowing reduction of the steam pressures within said steam chambers to a safe level, and removing said tire from said receptacle and then removing said rim and said lining from said tire.

10. A process as defined in claim 9 wherein said steam supplied to said inner steam chamber is at a pressure of about 70 p.s.i. and said steam supplied to said outer steam chamber is at a temperature of from 280° F. to about 300° F.

11. A process as defined in claim 10 wherein said inner wall is made of steam impervious material and wherein the steam supplied to said outer steam chamber is at a pressure of about 30 p.s.i. to about 35 p.s.i.

* * * * *